United States Patent [19]

Staege

[11] 3,990,229
[45] Nov. 9, 1976

[54] METHOD AND ARRANGEMENT FOR THE GENERATION OF ENERGY, PARTICULARLY ELECTRICAL ENERGY

[75] Inventor: Hermann Staege, Essen, Germany

[73] Assignee: Krupp-Koppers GmbH, Essen, Germany

[22] Filed: June 23, 1975

[21] Appl. No.: 589,208

[30] Foreign Application Priority Data
June 22, 1974 Germany............................ 2429993

[52] U.S. Cl. ............................ 60/39.02; 60/39.12; 60/39.18 B
[51] Int. Cl.$^2$ ....................................... F02B 43/00
[58] Field of Search ......... 60/39.02, 39.12, 39.18 B, 60/39.05; 48/203

[56] References Cited
UNITED STATES PATENTS

| | | | |
|---|---|---|---|
| 2,614,915 | 10/1952 | Hirsch | 60/39.12 |
| 2,665,200 | 1/1954 | Kwauk | 48/203 |
| 3,002,347 | 10/1961 | Sprague | 60/39.18 B |
| 3,375,175 | 3/1968 | Eddinger | 98/203 |
| 3,704,587 | 12/1972 | Krieb | 60/39.12 |
| 3,804,606 | 4/1974 | Archer | 60/39.12 |
| 3,866,411 | 2/1975 | Marion | 60/39.02 |
| 3,873,845 | 3/1975 | Osthaus | 60/39.12 |
| 3,882,671 | 5/1975 | Nebgen | 60/39.12 |

OTHER PUBLICATIONS
"United Aircraft Plans on 135-MW Combined Cycle Tests in Mid-1976" in Gas Turbine World, pp. 16–17, May, 1973.

Primary Examiner—Carlton R. Croyle
Assistant Examiner—L. J. Casaregola
Attorney, Agent, or Firm—Michael J. Striker

[57] ABSTRACT

Dried, finely divided coal is admitted into a gasifying chamber wherein it undergoes partial oxidation in the presence of air and water vapor so as to form a combustible gas. The combustible gas is cooled by heat-exchange with water thereby causing low-pressure and high-pressure steam to be generated. After being washed, compressed and desulfurized, the cooled combustible gas is admitted into a combustion chamber. Here, it is combusted in the presence of preheated air so as to form a combustion gas. The hot combustion gas preheats the air and water vapor used for the partial oxidation, superheats the high-pressure steam previously produced and generates additional high-pressure steam. As a result, the combustion gas is cooled. The cooled combustion gas is expanded in a gas turbine which drives an electrical generator. The expanded combustion gas then preheats the air which is used for the combustion, preheats the water which is to be converted to steam and also dries the coal which is to undergo partial oxidation. The high-pressure steam which has been generated is expanded in a steam turbine which drives an electrical generator. The steam recovered from the steam turbine may be condensed and recycled so as to again serve as a source of steam. The low-pressure steam generated by the combustible partial oxidation gas may serve as a source of water vapor for the partial oxidation. In the above manner, electrical energy may be generated in an economical manner.

9 Claims, 1 Drawing Figure

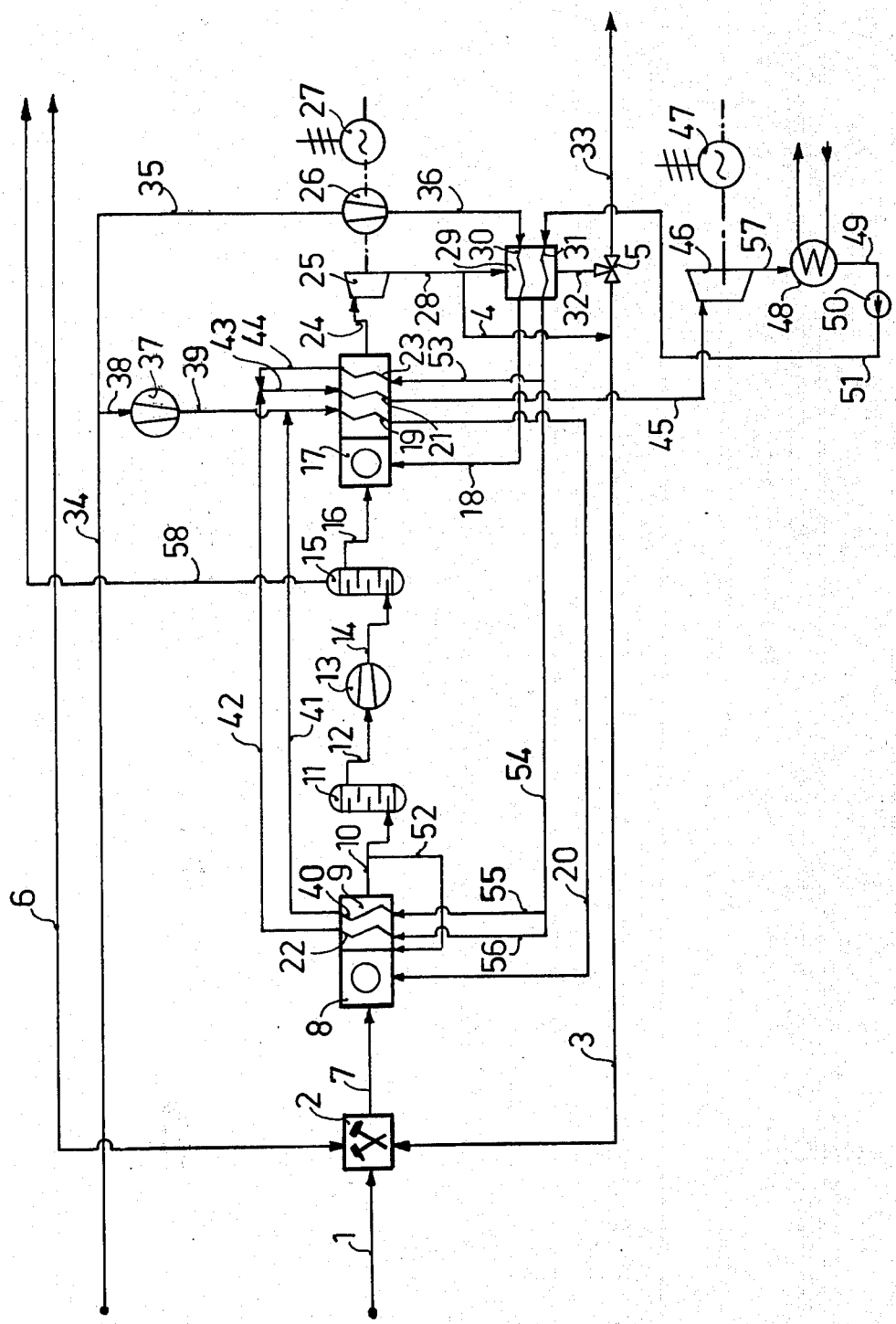

METHOD AND ARRANGEMENT FOR THE GENERATION OF ENERGY, PARTICULARLY ELECTRICAL ENERGY

BACKGROUND OF THE INVENTION

The invention relates generally to the generation of energy. Of particular interest to the invention is the generation of electrical energy.

The conventional methods used until now for the production of electrical energy in thermal power plants which operate on a coal or oil basis consist in that the coal or fuel oil serving as the energy source is combusted beneath steam boilers. The steam obtained in this manner is then expanded in steam turbines which are coupled with electrical generators.

In these methods, the sulfur compounds contained in the coal or fuel oil are converted into sulfur dioxide during the combustion period. Due to the ever stricter regulations governing environmental pollution, the sulfur dioxide can no longer be simply discharged into the atmosphere through the stacks provided for the combustion gases. However, the removal of the sulfur dioxide from the combustion gases poses great difficulties, particularly for large power plants. Although great efforts have been expended in this direction, the problem of removing sulfur dioxide from the combustion gases has not been satisfactorily solved to date.

In view of this, there has recently been discussed the possibility of first converting the coal or fuel oil used for the electrical generation into a fuel gas by gasification (partial oxidation) in a gasifying apparatus arranged upstream of the power plant and then using this fuel gas as an energy source in the power plant. The reason is that the sulfur compounds contained in the coal or fuel oil are not transformed into sulfur dioxide during gasification but, rather, are transformed primarily into hydrogen sulfide. The latter may be removed from the fuel gas produced by the gasification in a relatively simple manner using suitable physical and chemical wash processes so that the fuel gas may be conveyed to the power plant in a condition where it is largely free of sulfur.

Although the procedure just outlined apparently holds promise for overcoming the difficulties mentioned earlier, it has not yet become possible to apply this in a satisfactory manner.

SUMMARY OF THE INVENTION

Accordingly, it is a general object of the invention to provide a novel method and arrangement for the generation of energy.

Another object of the invention is to provide a method and arrangement which enable the last procedure outlined above to be applied in a practical manner.

A further object of the invention is to provide a method and arragement which enable energy to be generated in an economical manner.

An additional object of the invention is to provide for practical development of the last procedure outlined above and to provide a method and arrangement for the generation of electrical energy which are capable of operating in an economical manner.

The preceding objects, as well as others which will become apparent, are achieved in accordance with the invention. According to one aspect of the invention, there is provided a method of generating energy wherein a combustible partial oxidation gas is formed by gasifying (partially oxidizing) an oxidizable substance. The combustible gas is cooled, and steam is generated, by heatexchange between the combustible gas and a quantity of water. The cooled combustible gas is combusted so as to obtain a combustion gas. The combustion gas is cooled, and at least a portion of the steam generated by means of the combustible gas is super-heated, by heat-exchange between the combustion gas and this portion of the steam. The cooled combustion gas is expanded and the energy which thus becomes available for performing work is utilized in the performance of useful work. The super-heated steam is also expanded and the energy which thus becomes available for performing work is also utilized in the performance of useful work.

The cooled combustion gas may, for example, be expanded in a gas turbine. On the other hand, the super-heated steam may, for instance, be expanded in a steam turbine.

Of particular interest to the invention is the generation of electrical energy in a power plant which includes a gas turbine and a steam turbine using gas obtained by the gasification (partial oxidation) of coal in a gasifying apparatus arranged upstream of the power plant as an energy source. Accordingly, for the sake of simplification, the description herein will be primarily with reference thereto.

One embodiment of the invention conteplates, on the grounds of economy, for the gasification of the coal which is used to take place not in the presence of pure oxygen or in the presence of gases which have been enriched with oxygen but, rather, in the presence of air.

According to another embodiment of the invention, it is contemplated to make substantial use of the waste heat which is generated in the process.

A further embodiment of the invention contemplates for the largest possible proportion of the total electrical energy which is produced to be generated by the gas turbine. This is based on the consideration that a reduction in the quantity of steam generated which, in turn, is associated with a decrese in the proportion of the total electrical energy which is generated using steam, permits a reduction in the quantity of cooling water required for condensation of the steam to be achieved. Thus, it has been found that it is currently precisely the cooling water requirements which pose a severe problem for power plants which are to be newly erected.

A particularly advantageous aspect of the method according to the invention is characterized by a combination of the following measures, although it will be understood that certain individual ones of the features to be outlined, as well as certain combinations of the features to be outlined, may, of themselves, provide desirable results:

a. The combustible partial oxidation gas, that is, the gas which serves as an energy source, is obtained by concurrent gasification of dried and finely ground coal or of coal dust. In other words, the combustible gas is obtained using a concurrent gasifying procedure, that is, a gasifying procedure wherein concurrent motion of the reacting components occurs. The gasification is carried out with air and water vapor. The air and, favorably, both the air and the water vapor, is or are preheated to a temperature between about 300° and 1000° C.

b. The combustible gas obtained by the concurrent gasification is cooled to temperatures between about 150° and 350° C in a waste-heat boiler system while generating high-pressure and low-pressure steam. Thereafter, the combustible gas is washed, compressed to pressures between about 5 and 50 atmospheres absolute and desulfurized.

c. The desulfurized combustible gas is combusted in a combustion chamber with air which has been preheated to temperatures between about 200° and 600° C and which has been compressed to pressures between about 5 and 30 atmospheres absolute.

d. The hot combustion gas or flue gas produced by the combustion which takes place in the combustion chamber is cooled to temperatures between about 750° and 1000° C while its sensible heat is utilized for preheating of the air used for the gasification, for super-heating of steam and for the generation of high-pressure steam.

e. The combustion gas or flue gas which has been cooled to temperatures between about 750° and 1000° C is expanded in a gas turbine which is coupled with an electrical generator.

f. The high-pressure steam produced in the process is expanded in a steam turbine which is likewise coupled with an electrical generator.

g. The sensible heat of the expanded combustion gas leaving the gas turbine is utilized for preheating of the air used for the combustion, for preheating of the feed water and for drying of the coal.

The invention also contemplates an arrangement for generating energy, particularly electrical energy. An arrangement in accordance with one aspect of the invention comprises gasifying means for the production of a combustible partial oxidation gas. First heat-exchange means is provided for cooling the combustible gas produced in the gasifying means and combustion means is provided for combusting the cooled combustible gas. The arrangement further includes second heat-exchange means for cooling the combustion gas or flue gas produced in the combustion means. First work-performing means provided in the arrangement is operative in response to expansion of the cooled combustion gas. Water supply means is provided for supplying water to the first heat-exchange means so as to permit steam generation during cooling of the combustible gas. Conduit means connects the first and second heat-exchange means so as to permit steam generated in the first heat-exchange means to be super-heated in the second heat-exchange means during cooling of the combustion gas. Second work-performing means in the arrangement is operative in response to expansion of the super-heated steam.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE diagrammatically illustrates an arrangement in accordance with the invention which may be used for carrying out a method according to the invention.

DESCRIPTION OF THE PREFERRED EMBODIMENTS:

One manner of carrying out a method according to the invention will now be detailed with reference to the single FIGURE of the drawing.

An oxidizable substance or fuel to be gasified, which is here assumed to be in the form of raw or crude coal, is conveyed to a coal preparation apparatus 2 via a conveyor belt or similar conveying device 1. In the coal preparation apparatus 2, the coal is, in a single operation, ground in conventional manner and dried. Preferably, the coal is ground to a particle size between about 80 and 120 microns and simultaneously dried to a residual moisture content of about 1 to 10% by weight $H_2O$.

The drying of the coal is effected with at least a portion of the expanded combustion gas or flue gas obtained from a gas turbine 25. This combustion gas leaves the gas turbine 25 via a conduit 28 and is conveyed to the coal preparation apparatus 2 through a conduit 3. The temperature of the gas in the conduit 3 may be adjusted by withdrawing a portion of this gas directly from a conduit 4 which branches off from the conduit 28 immediately downstream of the gas turbine 25 while the remainder of the gas is withdrawn from a conduit 32. The portion of the gas withdrawn from the conduit 32 has previously passed through a preheating unit 29 and, consequently, has already undergone a certain degree of cooling in that it has been used for preheating purposes in the preheating unit 29. By mixing the two gas streams, that is, the gas stream from the conduit 4 and the gas stream from the conduit 32, the temperature desired, and which is required in dependence upon the moisture content of the coal, may be achieved without any difficulties.

After the drying and grinding operations, the cooled combustion gas and the grinding fines are withdrawn from the coal preparation apparatus 2 via a conduit 6. From the conduit 6, the cooled combustion gas and the grinding fines are discharged into the atmosphere via a stack which has not been illustrated here for the sake of clarity.

It will be self-understood that, instead of lumpy coal, it is also possible to utilize coal dust in the method according to the invention. In such as case, a grinding operation in the coal preparation apparatus 2 is not required. Depending upon the circumstances, the coal dust need only be subjected to a certain degree of drying insofar as its residual moisture content lies above the range indicated previously.

The finely divided coal leaves the coal preparation apparatus 2 via a conduit 7 and is admitted into a gasifier 8. In the gasifier 8, the finely divided coal is subjected to gasification (partial oxidation) with preheated air which is supplied to the gasifier 8 via a conduit 20. The gasification is advantageously carried out using a concurrent gasifying procedure, that is, the gasification is advantageously carried out in a manner such that the reacting components travel in the same direction. The gasifier 8 may be of a known, proven construction. For instance, the gasifier 8 may be in the form of a Koppers-Totzek gasifier.

The combustible partial oxidation gas generated during the gasification enters a waste-heat boiler system 9 in which it is cooled. The boiler system 9 may be arranged immediately adjacent the gasifier 8. If desired, it is even possible to combine the gasifier 8 and the boiler system 9 into a single structural unit. The boiler system 9 is provided with the waste-heat boilers 22 and 40.

High-pressure steam is generated in the boiler 22 whereas low-pressure steam is generated in the boiler 40. The low-pressure steam may be admixed with the air used for the gasification in the necessary amounts. For this purpose, a conduit 41 is provided. The conduit 41 communicates with a conduit 39 through which the air which is to be used for the gasification is conveyed to the conduit 20.

The cooled combustible gas leaves the boiler system 9 through a conduit 10. It is pointed out here that it may be necessary to cool the hot combustible gas leaving the gasifier 8 to a temperature below the ash melting point. In order to insure that the hot combustible gas leaving the gasifier 8 is cooled to below the ash melting point, it is possible, if necessary, to provide a conduit 52 which branches off from the conduit 10. A portion of the cooled combustible gas flowing through the conduit 10 may then be branched off from the latter through the conduit 52 and admixed with the hot combustible gas at a location intermediate the gas outlet of the gasifier 8 and the gas inlet of the boiler system 9.

The combustible gas leaving the boiler system 9 has advantageously been cooled to a temperature of approximately 200° C. The cooled combustible gas from the boiler system 9 flows through the conduit 10 for mechanical gas purification and further cooling. This occurs in conventional manner in a cooling washer 11. It is possible to provide for a high degree of purification of the combustible gas by arranging a suitable purifying apparatus downstream of the cooling washer 11. Such an apparatus may include a disintegrator and, if desired, an electrical filter. These elements have, however, not been illustrated here for the sake of clarity.

The combustible gas leaves the washer 11 via a conduit 12 and then enters a compressor 13. In the compressor 13, the combustible gas is compressed to a pressure between about 5 and 50 atmospheres absolute and, advantageously, to a pressure between about 10 and 20 atmospheres absolute. Subsequently, the combustible gas is conveyed through a conduit 14 to a desulfurizing apparatus 15. The desulfurizing apparatus serves to wash out the gaseous sulfur-containing components ($H_2S$ and COS) from the combustible gas. If necessary or desired, the combustion gas may also be scrubbed of carbon dioxide ($CO_2$). The desulfurization of the combustible gas is advantageously effected using a reliable absorption-regenerative procedure and the the known washing agents for this purpose may be utilized here. The gaseous components washed out of the combustible gas are removed from the process via a conduit 58.

The desulfurized combustible gas flows through a conduit 16 to a combustion chamber 17 in which it is combusted with preheated air. The combustion air may be preheated to a temperature between about 200° and 600° C and, advantageously, is preheated to a temperature between about 300° and 500° C. The combustion air is preferably also compressed. The combustion air may be compressed to a pressure between about 5 and 30 atmospheres absolute and is favorably compressed to a pressure between about 8 and 28 atmospheres absolute. The preheated and compressed combustion air is conveyed into the combustion chamber 17 via a conduit 18.

The hot combustion gas or flue gas generated in the combustion chamber 17 has a temperature of approximately 1500° C. The combustion gas is to be admitted into the gas turbine 25. The inlet temperature for the gas turbine 25 lies between about 750° and 1000° C and the requisite cooling of the hot combustion gas to this temperature range is undertaken as follows:

The hot combustion gas is conveyed by a preheater 19 which communicates with the conduits 20 and 39 through which air is supplied to the gasifier 8. In the preheater 19, a portion of the sensible heat of the hot combustion gas is transmitted to the air which is to be used for the gasification. The hot combustion gas thus heats the gasifying air to a temperature between about 300° and 1000° C and, particularly advantageously, to a temperature of approximately 800° C. The preheated gasifying air flows to the gasifier 8 through the conduit 20. The hot combustion gas is further conveyed by a super-heater 21. In the super-heater 21, a further portion of the sensible heat of the hot combustion gas is utilized for the super-heating of high-pressure steam. The hot combustion gas is also conveyed by a boiler 23. In the boiler 23, high-pressure steam is generated with the sensible heat of the hot combustion gas. The remaining sensible heat of the hot combustion gas may be exploited in the boiler 23.

The high-pressure steam which is super-heated in the super-heater 21 is derived from the boiler 23 and from the boiler 22 arranged downstream of the gasifier 8. For this purpose, a conduit 42 is provided for withdrawing high-pressure steam from the boiler 22 whereas a conduit 44 is provided for withdrawing high-pressure steam from the boiler 23. A conduit 43 communicates with the conduits 42 and 44, as well as with the super-heater 21, and serves to collect the high-pressure steam from the conduits 42 and 44 and direct it into the super-heater 21.

The preheater 19, the super-heater 21 and the boiler 23 may be combined into a single structural unit. In this manner, the hot combustion gas may be caused to flow through the three devices 19, 21 and 23 one immediately after the other. Such a structural unit may be arranged immediately adjacent the combustion chamber 17.

After passing by the preheater 19, the super-heater 21 and the boiler 23, the correspondingly cooled combustion gas flows to the gas turbine 25 via a conduit 24. In the gas turbine 25, an expansion of the combustion gas occurs and, concomitantly, energy which was previously stored in the combustion gas is liberated, that is, energy which was previously stored in the combustion gas becomes available for the performance of work. The expansion of the combustion gas is accompanied by a cooling of the same. The energy liberated for the performance of work is transmitted to and taken up by the gas turbine 25. The gas turbine 25, in turn, transmits a portion of the liberated energy to a compressor 26. The compressor 26 communicates with the conduit 18 through which the combustion air is supplied to the combustion chamber 17 via a conduit 36. The compressor 26 also communicates with a conduit 34 and a conduit 35 through which the combustion air is introduced into the conduits 36 and 18. The compressor 26 serves to compress the combustion air prior to its introduction into the combustion chamber 17. It will be seen that the compressor 26 is driven using energy which has been liberated by the expansion of the combustion gas.

The gas turbine 25 further transmits a portion of the energy liberated by the expansion of the combustion gas to an electrical generator 27. The electrical generator 27 is then driven so as to generate electrical energy. It will be seen that the electrical generator 27 is also driven using energy liberated by the expansion of the combustion gas.

The combustion gas which has been expanded and cooled in the gas turbine 25 leaves the latter via the conduit 28. A portion of the expanded combustion gas is branched off into the conduit 4 for direct transmittal to the coal preparation apparatus 2 via the conduit 3. The remainder of the expanded combustion gas flows through the conduit 28 to the preheating unit 29. The preheating unit 29 is provided with a preheater 30 and a preheater 31. The preheater 30 communicates with the conduits 36 and 18 through which the compressed combustion air is introduced into the combustion chamber 17. The preheater 31, on the other hand, communicates with a supply conduit 51 through which water is introduced therein. The preheater 31 further communicates with the boiler 23 via a conduit 53 and with the boilers 22 and 40 via a conduit 54. The conduit 54 branches off into the conduits 55 and 56 which lead to the boilers 40 and 22, respectively. It will thus be seen that the preheater 30 serves as a preheater for the combustion air whereas the preheater 31 serves as a preheater for the feed water.

In the preheating unit 29, some of the sensible heat of the expanded combustion gas is transferred to the combustion air via the preheater 30 whereas some of the sensible heat of the expanded combustion gas is transferred to the feed water via the preheater 31. Accordingly, the expanded combustion gas is cooled in the preheating unit 29.

The thus-cooled expanded combustion gas leaves the preheating unit 29 through the conduit 32. At the end of the conduit 32, there is provided a regulating valve 5 by means of which the expanded combustion gas flowing through the conduit 32 may be divided into two streams. One of these streams flows into a conduit 33 and, from there, into the atmosphere via a discharge stack which has not been illustrated for the sake of clarity. The other of the streams is admitted into the conduit 3 through which it is conveyed to the coal preparation apparatus 2. The manner of dividing the expanded combustion gas flowing through the conduit 32 into two streams, that is, the proportion of the expanded combustion gas which is admitted into the conduit 33 and the proportion thereof which is admitted into the conduit 3, is determined by the heat requirements which exist for the coal preparation apparatus 2.

As indicated earlier, the compressor 26 sucks in the requisite combustion air through the conduits 34 and 35. The compressor 26 then compresses the combustion air and forces it through the conduit 36 to the preheater 30. In the latter, the combustion air is heated. Thereafter, the combustion air flows through the conduit 19 to the combustion chamber 17.

Meanwhile, the gasifying air is sucked in by a compressor 37. As is the case of the combustion air, the gasifying air is derived from the conduit 34. The compressor 37 communicates with the conduit 34 via a conduit 38. In the compressor 37, the gasifying air is compressed. The gasifying air then flows into the gasifier 8 through the conduit 39, the preheater 19 and the conduit 20. Prior to entry of the gasifying air into the preheater 19, water vapor from the conduit 41 is admixed with the compressed gasifying air in the necessary amounts. It is advantageous for the water vapor to be used in quantities between about 0.01 and 0.1 normal cubic meter per normal cubic meter of air. As outlined previously, the water vapor derived from the conduit 41 is generated in the boiler 40 of the boiler system 9.

As also mentioned earlier, the high-pressure steam generated in the boiler 22 of the boiler system 9 flows to the steam super-heater 21 via the conduits 42 and 43. Similarly, the steam generated in the boiler 23 flows to the steam super-heater 21 through the conduits 44 and 43. In the super-heater 21, the steam derived from the boilers 22 and 23 is super-heated.

The super-heated steam leaves the super-heater 21 via a conduit 45 and enters a steam turbine 46. In the steam turbine 46, an expansion of the super-heated steam occurs and, concomitantly, energy which has been stored in the super-heated steam is liberated, that is, energy which has been stored in the super-heated steam is made available for the performance of work. The energy liberated by the expansion of the super-heated steam is transmitted to and taken up by the steam turbine 46. In turn, the steam turbine 46 transmits the liberated energy to an electrical generator 47 for the generation of electrical energy. The electrical generator 47 is thus driven using energy which has been liberated by the expansion of the super-heated steam.

The steam which has been expanded in the steam turbine 46 leaves the latter via a conduit 57. The expanded steam then enters a condenser 48 in which it is condensed. The condensate which is thus obtained flows through a conduit 49 to a pump 50. The pump 50 forces the condensate through the supply conduit 51 and into the feed water preheater 31.

In the preheater 31, the condensate is heated. From the preheater 31, the heated condensate flows into the conduit 54 in order to be re-used as feed water. As indicated earlier, the conduit 54 successively branches off into the conduits 53, 55 and 56. By means of the conduits 53, 55 and 56, the boiler 23, as well as the two boilers 22 and 40, may be supplied with feed water.

The following example, which is intended to further illustrate the invention and is not to be construed as limiting the same, is based on the conversion of 1000 kilograms of crude coal into a fuel gas. The crude coal has the following composition:

| | |
|---|---|
| Water | 8.00% by weight |
| Ash | 20.00% by weight |
| C | 59.36% by weight |
| H | 4.27% by weight |
| S | 1.00% by weight |
| N | 0.91% by weight |
| O | 6.46% by weight |

This coal was dried to a residual moisture content of 1.5% $H_2O$ in the coal preparation apparatus 2 and simultaneously ground to a particle size of 90 microns. Subsequently, the coal was gasified in the gasifier 8 at a temperature of 1500° C and a pressure of 1.05 atmospheres absolute. The requisite gasifying air, in a quantity of 3,650 kilograms, was conveyed to the gasifier 8 with a temperature of 800° C and under a pressure of 2.06 atmospheres absolute. The gasifying air contained 60 kilograms of water vapor. The dry gas generated in the gasifier 8 had the following composition after leaving the boiler system 9:

| | |
|---|---|
| $CO_2$ | 4.48 % by volume |
| $CO$ | 23.70 % by volume |
| $H_2$ | 9.37 % by volume |
| $N_2$ | 62.09 % by volume |
| $CH_4$ | 0.10 % by volume |
| $H_2S$ | 0.26 % by volume |

The quantity of gas obtained was 4,405 kilograms. This gas was treated in the manner described above to obtain a hot combustion gas. The quantity of hot combustion gas conveyed to the gas turbine 25 via the conduit 24 was 8,450 kilograms and the combustion gas had a temperature of 920° C and was under a pressure of 11 atmospheres absolute.

At the same time, a quantity of 3,705 kilograms of super-heated water vapor at a temperature of 530° C and under a pressure of 180 atmospheres absolute was conveyed to the steam turbine 46 through the conduit 45.

The total quantity of electricity generated with the two turbines was 2100 kilowatts. Approximately 43% of this electricity was generated by the gas turbine 25 whereas the remainder was generated by the steam driven turbine 46.

Some of the important advantages achievable with the invention are once again presented below in summary form:

1. By gasifying dust-like or finely ground coal using concurrent motion, it becomes possible to utilize practically all existing types of coals so long as the ash contents thereof do not exceed about 50%.

2. Distillation products of the coals, such as tar, oils, benzine, phenols and so on, which may lead to operational disturbances in the individual stages of the process, particularly in the gas turbine, do not arise during the concurrent gasification. Accordingly, no apparatus and devices for the treatment of such distillation products need be installed.

3. The sulfur present in the coal is obtained in the form of gaseous compounds ($H_2S$ and COS) which may be removed from the partial oxidation gas with relative simplicity and which may be further processed in accordance with known, proven methods to yield marketable products (sulfuric acid and elemental sulfur).

4. Since air instead of oxygen is advantageously used as a gasifying medium, the necessity of installing an expensive air decomposition apparatus for recovering pure oxygen may be eliminated.

5. The gasifying air may be heated to the requisite temperature with substantially no losses by the combustion gas from the combustion chamber. In contrast, when using separate preheaters which are heated by gas, it is possible to count upon an efficiency of only 80%.

6. By using only a portion of the heat which is available between the combustion chamber and the gas turbine for the gasification of the coal, the amount of steam generated may be reduced and, concomitantly, the amount of heat transmitted to the gas turbine may be increased. In this manner, the ratio between the energy generated in the gas turbine and in the steam turbine may be favorably shifted towards the gas turbine. This enables a better overall efficiency to be achieved and makes it possible to reduce the quantities of cooling water required for the condensation of steam. It will be understood that each of the elements described above, or two or more together, may also find a useful application in other types of methods and arrangements differing from the types described above.

While the invention has been illustrated and described as embodied in methods and arrangements for the generation of electrical energy, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpont of prior art, fairly constitute essential characteristics of the generic or specific aspects of this invention.

What is claimed as new and desired to be protected by Letters Patent is set forth in the appended claims.

I claim:

1. A method of generating energy, comprising drying finely divided coal; forming a combustible partial oxidation gas by gasifying said coal, said gasification being carried out with concurrent motion of the reacting components and in the presence of air and water vapor which have been preheated to temperatures between about 300° and 1000° C; cooling said combustible gas to temperatures between about 150° and 350° C and generating both low-pressure and high-pressure steam by heat-exchange between said combustible gas and a quantity of water; washing said combustible gas subsequent to said cooling thereof; compressing said combustible gas to pressures between about 5 and 50 atmospheres absolute subsequent to said cooling thereof; desulfurizing said combustible gas subsequent to said cooling thereof; combusting the cooled combustible gas so as to obtain a combustion gas, said combustion being carried out in the presence of air which has been preheated to temperatures between about 200° and 600° C and compressed to pressures between about 5 and 30 atmospheres absolute; cooling said combustion gas to temperatures between about 750° and 1000° C, said cooling of said combustion gas comprising passing said combustion gas in heat-exchange with said high-pressure steam so as to superheat said high-pressure steam, passing said combustion gas in heat-exchange with the air for said gasification so as to preheat the air for said gasification, passing said combustion gas in heat-exchange with an additional quantity of water so as to generate additional high-pressure steam; expanding the cooled combustion gas in a gas turbine which generates electrical energy with the energy from said expansion of said combustion gas; passing the expanded combustion gas in heat-exchange with the air for said combustion so as to preheat the air for said combustion; passing said expanded combustion gas in heat-exchange with said quantities of water so as to heat said quantities of water prior to the respective heat-exchanges thereof with said combustible gas and said combustion gas so as to generate steam; utilizing said expanded combustion gas in said drying of said coal; and expanding the superheated high-pressure steam in a steam turbine which generates electrical energy with the energy from said expansion of said high-pressure steam.

2. The method of claim 1, wherein said additional highpressure steam is expanded and the energy which thus becomes available for performing work is utilized in the performance of useful work.

3. The method of claim 2, wherein the energy from said expansion of said additional high-pressure steam is used to generate electrical energy.

4. The method of claim 1, wherein said water vapor for said gasification is used in quantities between about 0.01 and 0.1 normal cubic meter per normal cubic meter of gasifying air.

5. The method of claim 1, wherein said gasification is carried out at pressures between about 1 and 35 atmospheres absolute.

6. The method of claim 1, wherein a portion of the cooled combustible gas is admixed with the hot combustible gas formed by said gasification prior to heat-exchange of said hot combustible gas with water so as to generate steam.

7. The method of claim 1, wherein at least part of the energy from said expansion of said combustion gas is used to compress the combustion air.

8. The method of claim 1, wherein said coal is dried to a residual moisture content between about 1 and 10 percent by weight prior to said gasification.

9. The method of claim 1, wherein said coal is ground to a particle size between about 80 and 120 microns prior to said gasification.

* * * * *